(12) United States Patent
Johnston et al.

(10) Patent No.: US 11,589,576 B2
(45) Date of Patent: Feb. 28, 2023

(54) MONITORING APPARATUS FOR TEMPERATURE-CONTROLLED SAMPLE COLLECTION AND TRANSPORT

(71) Applicant: BLUECHIIP LIMITED, Scoresby (AU)

(72) Inventors: Ian Johnston, Northampton (GB); Andrew McLellan, Ashburton (AU); Scott Turner, Mornington (AU)

(73) Assignee: BLUECHIIP LIMITED, Scoresby (AU)

( * ) Notice: Subject to any disclaimer, the term of this patent is extended or adjusted under 35 U.S.C. 154(b) by 489 days.

(21) Appl. No.: 16/314,609

(22) PCT Filed: Jun. 30, 2017

(86) PCT No.: PCT/AU2017/050683
§ 371 (c)(1),
(2) Date: Dec. 31, 2018

(87) PCT Pub. No.: WO2018/000051
PCT Pub. Date: Jan. 4, 2018

(65) Prior Publication Data
US 2019/0320650 A1 Oct. 24, 2019

(30) Foreign Application Priority Data
Jul. 1, 2016 (AU) .................... 2016902600

(51) Int. Cl.
*A01N 1/02* (2006.01)
*B01L 3/00* (2006.01)
(Continued)

(52) U.S. Cl.
CPC .......... *A01N 1/0257* (2013.01); *A01N 1/0268* (2013.01); *A01N 1/0284* (2013.01);
(Continued)

(58) Field of Classification Search
CPC .. A01N 1/0257; A01N 1/0268; A01N 1/0284; B01L 3/545; B01L 9/523;
(Continued)

(56) References Cited

U.S. PATENT DOCUMENTS 7,958,791 B2 * 6/2011 Zimmermann .......... A01N 1/02
73/863.11
8,900,856 B2 * 12/2014 Muller-Cohn ........... A01N 1/00
435/307.1
(Continued)

FOREIGN PATENT DOCUMENTS

WO 2008077059 A2 6/2008
WO 2008137409 A1 11/2008

OTHER PUBLICATIONS

International Search Report for corresponding application PCT/AU2017/050683 filed Jun. 30, 2017; dated Sep. 14, 2017.
(Continued)

*Primary Examiner* — Michael L Hobbs
*Assistant Examiner* — Lenora A Abel
(74) *Attorney, Agent, or Firm* — Cantor Colburn LLP (57) ABSTRACT

A system is provided for transporting, handling and monitoring samples in a temperature-controlled storage environment. The system includes a handheld carrier configured to transfer samples to and from a temperature-controlled storage station and a temperature-controlled container for receiving and housing one or more carriers. The carrier includes an integrated sample identification and temperature sensing capability configured to monitor a thermal history of one or more samples during transport, handling and storage including as the samples are conveyed between the temperature-controlled storage environment and the temperature-controlled container. That is, the carrier is adapted to be held in the hand during use. A carrier for conveying and
(Continued)

monitoring samples during transport, handling and storage is also provided.

16 Claims, 6 Drawing Sheets

(51) Int. Cl.
    *B01L 9/00*            (2006.01)
    *G01K 1/02*            (2021.01)
    *G01N 35/00*           (2006.01)
    *B01L 7/04*             (2010.01)

(52) U.S. Cl.
    CPC .............. *B01L 3/545* (2013.01); *B01L 9/523* (2013.01); *G01K 1/02* (2013.01); *G01N 35/00732* (2013.01); *B01L 7/04* (2013.01); *B01L 2200/147* (2013.01); *B01L 2200/18* (2013.01); *B01L 2300/022* (2013.01); *B01L 2300/023* (2013.01); *G01N 2035/00346* (2013.01); *G01N 2035/00831* (2013.01); *G01N 2035/00891* (2013.01)

(58) Field of Classification Search
    CPC .. B01L 7/04; B01L 2200/147; B01L 2200/18; B01L 2300/022; B01L 2300/023; G01K 1/02; G01N 35/00732; G01N 2035/00346; G01N 2035/00831; G01N 2035/00891
    USPC ....................................... 435/307.1
    See application file for complete search history.

(56) References Cited

U.S. PATENT DOCUMENTS

| | | |
|---|---|---|
| 2006/0020881 A1 | 1/2006 | Szabo |
| 2006/0162653 A1 | 7/2006 | Lihl |
| 2006/0208881 A1* | 9/2006 | Suzuki ................... G16H 10/40 340/539.27 |
| 2008/0052044 A1 | 2/2008 | Shoenfeld |
| 2012/0293338 A1* | 11/2012 | Chaffey ............... A01N 1/0257 340/870.02 |
| 2013/0232998 A1* | 9/2013 | Ward ................... A01N 1/0268 62/51.1 |
| 2014/0041403 A1 | 2/2014 | Anderson |
| 2015/0204598 A1 | 7/2015 | Affleck |
| 2015/0356500 A1 | 12/2015 | Larson |
| 2016/0135447 A1 | 5/2016 | Visinoni |

OTHER PUBLICATIONS

Written Opinion of the International Searching Authority for corresponding application PCT/AU2017/050683 filed Jun. 30, 2017; dated Sep. 14, 2017.
Examination report dated Jun. 24, 2021 issued by IP Australia on corresponding Australian Patent Application No. 2017287017.
Communication pursuant to Article 94(3) EPC for Corresponding application EP 17818757.1; dated Apr. 8, 2021.
Communication pursuant to Article 94(3) EPC for Corresponding application EP 17818757.1; dated Dec. 9, 2020.
Extended European Search Report, including the supplementary European search report and European Search Opinion for corresponding application 17818757.1; Report dated Dec. 10, 2019.

* cited by examiner

MONITORING APPARATUS FOR TEMPERATURE-CONTROLLED SAMPLE COLLECTION AND TRANSPORT

TECHNICAL FIELD

The disclosure relates generally to the monitoring of samples during collection, storage and handling in a temperature-controlled storage environment, such as the collection, freezing and cold storage of biological samples in freezers and cryogenic tanks. It relates more particularly to transfer of samples from one temperature-controlled storage environment to another, and continuous monitoring of the samples including the period of transfer from initial freezing in a controlled rate freezer, through transport to storage containers, short, medium or long-term storage, to thawing in a heated water bath.

BACKGROUND

Biological samples must be stored at low temperature to reduce risk of cellular damage and maintain cell viability. These temperatures are usually in the range of −80° C. to −200° C., typically provided by mechanical freezers or in dry ice, at −80° C., or in liquid nitrogen vapour, at less than the glass transition temperature of water, typically at less than −150° C. When biological samples are exposed to ambient temperatures of a lab or repository, for example when transferring from one cryogenic storage location to another, their temperature tends to rise rapidly potentially causing the sample to thaw or otherwise suffer degradation. Similarly, repeatedly cycling the sample temperature between frozen and partially or fully thawed can cause damage to the cell structure. In some cases, the sample is rendered no longer suitable for its intended purpose.

Different biological materials have different critical temperatures, that is, a temperature above which changes may occur at the cell structural level and accordingly is recognised as the critical temperature above which the biological material may degrade. The sample need not necessarily thaw, to be above its critical temperature, usually considered to be the glass transition temperature of water, and may suffer cellular damage whilst remaining in the frozen state. It is generally accepted that the sample must be held below this critical temperature at all times from the time it was first frozen to the time when it is intentionally thawed in a controlled manner for final processing.

Transferring samples from one controlled-temperature storage vessel or transportation vessel to another exposes the sample to the ambient environment inevitably causing the temperature of the sample to rise. Typically, the temperature of the samples during transfer is unknown. Similarly, processing samples in dry ice in basins and cryocarts that are open to the ambient environment, i.e. room temperature, causes their temperature to rise significantly due to air circulation and non-uniform contact with colder surfaces.

In order to maintain the viability of samples and to minimise the potential for cellular degradation the time for which samples are exposed to the ambient environment must be minimised. Samples are typically transferred from a controlled rate freezer to a transport vessel and then to a storage vessel, such as a freezer or liquid nitrogen tank and subsequently to another storage vessel, or to a dry shipper for transportation to another location. Transferring samples from one vessel or container to another typically takes place by placing the sample in an open tray or in a basin of dry ice. The dry ice pellets cover the base of the basin and the sample boxes, which contain the sample vials, rest on top of the pellets. Typically, not all of the samples stored in vials within a particular tray or box are required to be transferred to another location or storage vessel. Accordingly, those samples that are required to be moved, have to be identified, retrieved and transferred to another tray or box. The original tray or box is then returned to the original storage vessel and the new tray or box is moved to the new storage vessel or container.

The identification, retrieval and transfer of the required samples takes time and these tasks are necessarily performed outside of the temperature-controlled environment provided by the freezer or liquid nitrogen tank. While the acts of identifying, retrieving and transferring the samples to another tray or box may take place in a cooled environment, such as a dry ice basin or a liquid nitrogen charged cryocart, the sample trays and boxes do experience ambient temperatures during the process of moving the tray or box from the freezer or tank to the basin or cryocart. This practice of moving samples around within an ambient environment can suffice to raise the temperature of the sample above its critical temperature and cause cellular damage thereby impacting the integrity of the sample.

In particular, resting the boxes on the dry ice pellets keeps the vials at a temperature lower than the ambient temperature, but not at storage temperatures. Even if the boxes are somewhat buried in the dry ice pellets, the tops of the vials are exposed to room temperature and to circulating air flow. Cryocarts have somewhat better temperature control within their vessel but are relatively large and unwieldy. This means they are limited in where they can be used and positioned in a lab. Cryocarts are also significantly more expensive to purchase and operate.

In transferring samples from one storage location to another and transferring individual samples between containers, there is generally no tracking of sample temperatures. Handwritten notes or printed barcodes, and more recently RFID tags may be used for sample identification but there is no recordal of location nor temperature data. Accordingly, technicians are generally unaware of the temperature of the samples, usually assuming the temperature is that of the dry ice or the temperature indicated by a single thermocouple attached to the cryocart. This is despite the criticality of the temperature control and the significant potential for thawing and cellular damage.

It would be desirable to provide a device that enables a biological sample to be transferred between temperature-controlled environments in a safe manner, where the temperature change is minimised, where the temperature is tracked with identity to ensure the sample does not rise above the critical temperature, and which ameliorates and/or overcomes one or more problems or inconveniences of the prior art.

SUMMARY

According to an aspect of the present disclosure, there is provided a system for transporting, handling and monitoring samples in a temperature-controlled storage environment, including: a handheld carrier configured to transfer samples to and from a temperature-controlled storage station; and a temperature-controlled container for receiving and housing one or more carriers; wherein at least the carrier includes an integrated sample identification and temperature sensing capability configured to monitor a thermal history of one or more samples during transport, handling and storage including as the samples are conveyed between the temperature-controlled storage environment and the temperature-controlled container. That is, the carrier is adapted to be held in the hand during use.

The carrier may include a display configured to display to a user the identification and/or temperature of one or more samples placed on the carrier. Preferably the display is configured to be observable by a user as the carrier is used to transfer samples to or from a temperature-controlled storage facility. The display could be configured to be observable by a user once the carrier is placed in the temperature-controlled container. More preferably, the display is configured to be observable by a user both as the carrier is used to transfer samples to or from a temperature-controlled storage facility and once the carrier is placed in the temperature-controlled container.

The temperature-controlled container may also include an integrated sample identification and temperature sensing capability configured to monitor a thermal history of one or more samples during transport, handling and storage. Furthermore, the temperature-controlled container may include a display configured to display to a user the identification and/or temperature of one or more samples placed in the container The display provided on the carrier and/or the temperature-controlled container should be visible to the user at any point during collection, transport or handling to, from or within a temperature-controlled storage facility or between temperature controlled stations such as control rate freezers, cryogenic shippers, cryocarts, freezers, cryogenic storage tanks and controlled thaw baths or the like. This enables constant and continuous monitoring of the temperature of the relevant samples.

The handheld carrier may include a handle and a tray portion, the tray portion configured to be slid into a port of a rack or tower provided in the temperature-controlled storage facility in order to withdraw a sample located in the port.

The tray portion may be configured to accommodate different numbers and arrangements of sample trays. The sample trays may be any suitable apparatus adapted for holding a collection of samples. For example, this apparatus could take the form of a box for holding one or more samples, a microplate or mircowell plate.

The identification sensing capability may be provided by one or more interrogators for reading one or more machine-readable tags provided on or associated with the samples. The machine-readable tags may be provided on the samples themselves, or could be provided on the box or microplate, such that one machine-readable tag is associated with a collection of samples. In some embodiments the machine-readable tags are distributed across the box or microplate so that each machine-readable tag is associated with a collection of proximally located samples. The interrogators are similarly distributed across the tray portion for reading correspondingly distributed machine-readable tags on the samples, boxes or microplates.

In some embodiments the machine-readable tags provided on or associated with the samples are selected from one or more of the group including: barcodes, inductive coupling, optical coupling including laser, visible or non-visible, radio frequency, and chip or chipless radio frequency identification (RFID).

The temperature sensing capability may be provided by one or more temperature sensors provided on or associated with the samples. The temperature sensors are distributed on the tray portion such that they are in thermal proximity to the samples.

In some embodiments the temperature sensors provided on or associated with the samples are selected from one or more of the group including: optical including laser and infra-red, or wired including thermocouple, thermistor or resistance temperature detectors (RTD).

In other embodiments, the handheld carrier or the temperature-controlled container may include one or more integrated interrogators for reading one or more machine-readable tags, each machine-readable tag being associated with at least one sample positioned on the tray portion in thermal proximity thereto, and each machine-readable tag encoding an identifier and having a temperature dependent characteristic.

The one or more integrated interrogators may each include an interrogation coil configured to interrogate the machine-readable tags associated each with the samples. The interrogation coil or coils may be positioned such that they are in proximity to a machine-readable tag associated with a sample placed on the carrier in use.

The handheld carrier may include an integrated signal processing circuitry to generate an interrogation signal in the interrogation coil such that when the interrogation coil is in proximity with a coil antenna coupled to the machine-readable tag an excitation signal is induced in the coil antenna from the interrogation signal in the interrogation coil.

The machine-readable tag may include at least one resonant member and the temperature dependent characteristic is a shift in resonant frequency of the at least one resonant member as a function of temperature.

The handheld carrier may include an alert component which emits an alert if a sensed temperature exceeds a predetermined threshold. The alert may be one of an auditory, visual or sensory alert.

The handheld carrier may include a communications component for transmitting the identification and/or temperature of one or more samples placed on the carrier to a remote computing system to provide a data log accessible over a communications network.

In one form of the disclosure, the handle is configured to be decoupled from the tray portion to enable the handle to be used to facilitate conveyance of more than one tray portion between the temperature-controlled storage environment and the portable temperature-controlled container.

The temperature-controlled container may be portable. This may be achieved by providing a handle on the temperature-controlled container and configuring the container such that it is practical to handle in one hand.

In one embodiment, the portable temperature-controlled container is configured to receive more than one carrier in a side-by-side arrangement. According to this embodiment, the portable temperature-controlled container may be configured for top loading or for side loading the one or more carriers.

In another embodiment, the portable temperature-controlled container is configured to receive more than one carrier in a stacked arrangement. According to this embodiment, the portable temperature-controlled container may be configured for top loading or for side loading the one or more carriers.

The portable temperature-controlled container may include a housing having an opening forming an internal cavity configured to receive one or more handheld carriers; a lid configured to substantially close the opening; wherein the housing further includes a recess configured to receive the handle of the carrier such that closing of the lid substantially seals the internal cavity when the one or more carriers are placed in the housing.

The lid may seal the internal cavity such that a temperature-controlled environment can be provided therein.

An exterior of the housing may include a recess adapted to receive the handle therein such that the handle does not significantly protrude from a front face of the housing when the one or more carriers are placed in the housing.

The housing may be configured to receive more than one handheld carrier in a side-by-side arrangement, such that each carrier is housed in a separate cavity and the lid is split to provide for individual sealing of each separate cavity.

The portable temperature-controlled container may be used as a transport container for keeping samples cold while transporting the samples from one temperature-controlled vessel to another or it may be used as a thawing chamber for the purpose of raising the temperature of the samples in a controlled way. In this embodiment, the handheld carrier is placed in the temperature-controlled container, which has previously be charged with a warm liquid. The liquid is maintained at a constant temperature and the temperature of the samples on the carrier is raised in a controlled manner.

According to another aspect of the present disclosure, there is provided a handheld carrier for conveying and monitoring samples during transport, handling and storage, including an integrated sample identification and temperature sensing capability configured to monitor a thermal history of one or more samples during transport and storage including as the sample is conveyed between a first temperature-controlled storage environment and a second temperature-controlled storage environment.

The handheld carrier may include a display configured to display to a user the identification and/or temperature of one or more samples placed on the carrier. Preferably, the display may be configured to be observable by a user as the carrier is used to transfer samples to or from the first and/or second temperature-controlled environment. The display may be configured to be observable by a user once the carrier is placed in the first and/or second temperature-controlled environment. More preferably, the display is configured to be observable by a user both as the carrier is used to transfer samples to or from the first temperature-controlled environment and once the carrier is placed in the second temperature-controlled environment.

The handheld carrier may include a handle and a tray portion, the tray portion configured to be slid into a port of a rack or tower provided in the first temperature-controlled environment in order to withdraw a sample located in the port.

The tray portion may be configured to accommodate different numbers and arrangements of sample trays or boxes.

The identification sensing capability may be provided by one or more interrogators for reading one or more machine-readable tags provided on or associated with the samples.

In an embodiment, the machine-readable tags may be provided on or associated with the samples is selected from one or more of the group including: barcodes, inductive coupling, optical coupling including laser, visible or non-visible, radio frequency, and chip or chipless radio frequency identification (RFID).

The temperature sensing capability may be provided by one or more temperature sensors provided on or associated with the samples.

The temperature sensors are selected from one or more of the group including: optical including laser and infra-red, or wired including thermocouple, thermistor or resistance temperature detectors (RTD).

The handheld carrier may include one or more integrated interrogators for reading one or more machine-readable tags, each machine-readable tag being associated with at least one sample positioned on the tray portion in thermal proximity thereto, and each machine-readable tag encoding an identifier and having a temperature dependent characteristic.

The one or more integrated interrogators may each include an interrogation coil configured to interrogate the machine-readable tags associated each with the samples.

The interrogation coil or coils may be positioned such that they are in proximity to a machine-readable tag associated with a sample placed on the carrier in use.

The handheld carrier may include an integrated signal processing circuitry to generate an interrogation signal in the interrogation coil such that when the interrogation coil is in proximity with a coil antenna coupled to the machine-readable tag an excitation signal is induced in the coil antenna from the interrogation signal in the interrogation coil.

The machine-readable tag may include at least one resonant member and the temperature dependent characteristic is a shift in resonant frequency of the at least one resonant member as a function of temperature.

The handheld carrier may further include an alert component which emits an alert if a sensed temperature exceeds a predetermined threshold. The alert may be one of an auditory, visual or sensory alert.

The handheld carrier may further include a communications component for transmitting the identification and temperature of one or more samples placed on the carrier to a remote computing system to provide a data log accessible over a communications network.

The handle may be configured to be decoupled from the tray portion to enable the handle to be used to facilitate conveyance of more than one tray portion between the temperature-controlled storage environment and the portable temperature-controlled container.

According to yet another aspect of the present disclosure, there is provided a method for monitoring samples stored in a temperature-controlled storage environment during handling and transport, including transferring samples between a temperature-controlled storage station and a portable temperature-controlled container using a handheld carrier to transfer the samples to and from a temperature-controlled storage station, the portable temperature-controlled container being configured to receive and house one or more carriers; reading an identification and temperature of one or more samples placed on the carrier using an integral identification and temperature sensing capability in the carrier; and displaying to a user the identification and temperature of one or more samples placed on the carrier.

The step of reading an identification and temperature of one or more samples placed on the carrier may include one or more integrated interrogators reading one or more machine-readable tags, each machine-readable tag being associated with a sample positioned on the carrier in thermal proximity thereto, and each machine-readable tag encoding an identifier and having a temperature dependent characteristic.

The step of the one or more integrated interrogators reading one or more machine-readable tags may include an integrated signal processing circuitry generating an interrogation signal in one or more interrogation coils each associated with one or the one or more interrogators such that when the interrogation coil is in proximity with a coil antenna coupled to the machine-readable tag an excitation signal is induced in the coil antenna from the interrogation signal in the interrogation coil.

The method may further include the step of transmitting the identification and temperature of one or more samples placed on the carrier to a remote computing system at predetermined intervals to provide a data log accessible over a communications network.

BRIEF DESCRIPTION OF THE DRAWINGS

It will be convenient to hereinafter describe the disclosure in greater detail by reference to the accompanying figures which facilitate understanding of the method according to this disclosure. The particularity of the figures and the related description is not to be understood as superseding the generality of the broad identification of the disclosure as given in the attached claims.

DETAILED DESCRIPTION OF THE DRAWINGS

Figure 1:
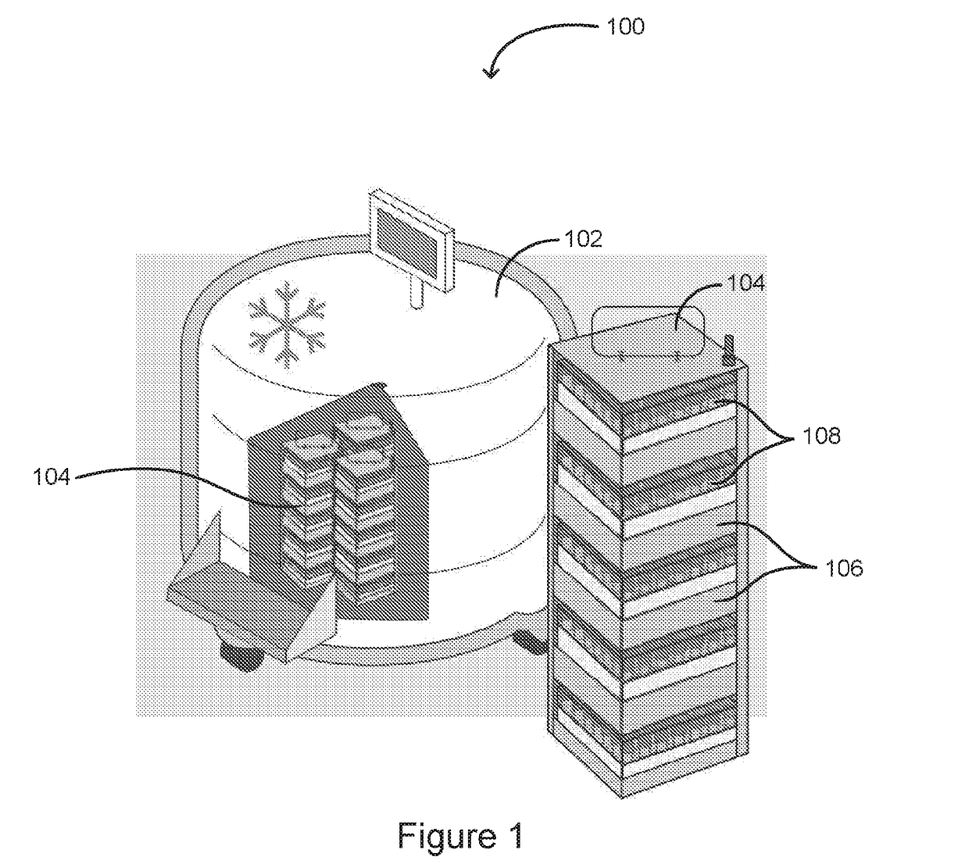
FIG. 1 shows a schematic of a temperature-controlled storage facility according to the prior art.

Referring firstly to FIG. 1, there is shown a group of structures defining a temperature-controlled storage environment 100. In this case, there is shown a cryogenic tank 102 that are used to store biological samples. Within each cryogenic tank 102 is located a series of racks. One rack 104 is shown outside of the cryogenic tank 102 for improved visibility. Each rack 104 houses a series of boxes or trays 106 which are adapted to house samples 108. It will be appreciated that a cryogenic tank 102 is just one example of a temperature-controlled environment suitable for use with the present disclosure, and that other suitable structure could be envisaged.

The samples 108 themselves may be contained in vials, tubes, bags such as blood bags for example, or any other suitable container. Accordingly, the tank 102, rack 106, box, microplate or microwell 106 and sample containers 108 house the biological samples in a hierarchical sense, wherein each higher hierarchical level is adapted to house one or more containers at a lower hierarchical level.

A machine-readable tag encoding an identification is associated with one or more samples. The samples are typically collectively stored in microplates or boxes and the machine-readable tag or tags associated with the samples is affixed to the microplate or box. That is, one machine-readable tag may be associated with a group of samples. The machine-readable tags can be distributed across the box or microplate so that each machine-readable tag is associated with a collection of proximally located samples. For example, if four machine-readable tags were to be provided on a microplate in opposing quadrants, then each machine-readable tag would be associated with any samples located in that particular quadrant of the microplate. In other embodiments of the disclosure, the machine-readable tags may be affixed to the sample container, such as a vial or test tube, directly such that there is a direct association between the machine-readable tags and the lower most hierarchical level of containers within which the biological samples are stored.

A transfer system including a handheld carrier containing a temperature and identification tracking system to be used for the transfer of samples between one temperature-controlled storage environment and another is provided. The carrier itself and the system have application anytime or place it may be necessary to remove samples from a temperature-controlled environment whether for the purposes of transporting them to a temperature-controlled environment located at a remotely located facility, identifying and removing samples for processing, or conveying samples from one temperature-controlled storage environment to another located at the same facility.

Figure 2:
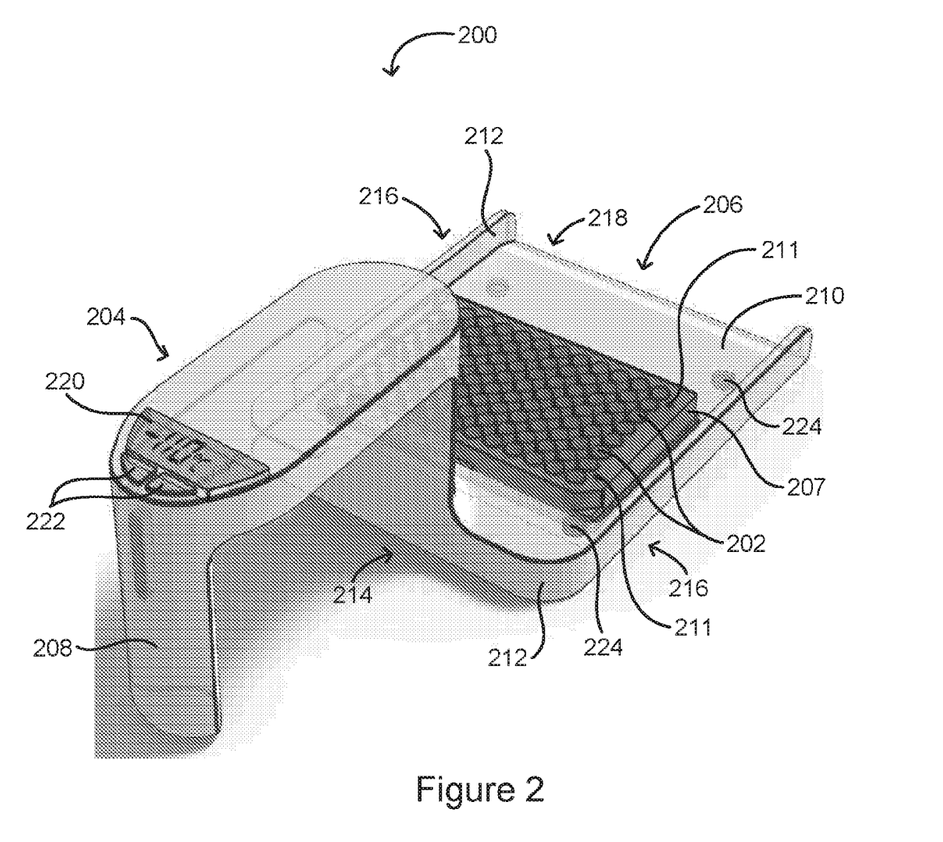
FIG. 2 shows a perspective view of a carrier configured to transfer samples to and from a temperature-controlled storage facility according to one embodiment of the present disclosure.

Referring now to FIG. 2, there is shown the handheld carrier 200 for conveying samples 202 between temperature-controlled storage environments. The carrier 200 includes an integrated sample identification and temperature sensing capability to facilitate monitoring of the samples 202 that are conveyed using the carrier. In particular, it is intended that the integrated sensing capability enables a thermal history of the sample to be collected and maintained during transport, storage and or processing including throughout the duration in which the samples are not within the temperature-controlled storage environment which typically involves exposing the sample to an ambient temperature environment.

The carrier 200 includes a handle 204 and a tray portion 206. The tray portion 206 is configured to carry the one or more samples to be transferred. The samples 202 may be conveyed in their individual sample containers, but will more typically be conveyed in a box or on a microplate 207 housing a group of samples. The tray portion 206 is configured to be slid into a port of a rack or tower 104 (as shown in FIG. 1) provided in the temperature-controlled environment in order to withdraw a sample located in the port. That is, the tray portion 206 has a generally flat bearing surface 210 and may have a lip 212 formed at the rear 214 of the bearing surface and on the two opposing edges 216 to assist in containing the samples 202, whilst providing an unobstructed front edge 218 to facilitate sliding of the tray portion 206 into a rack as described. Moreover, the provision of a lip 212 may go some way towards insulating the samples 202 disposed on the carrier against the ambient temperature. The handle 204 includes a grip portion 208 to be gripped by a user.

In some embodiments, an insulating cover or lid (not shown) is provided to be placed over the samples immediately when they are removed from the temperature-controlled storage environment on the carrier. In one form, this cover could be comprised of a foam, plastic, polystyrene or similar material having thermal insulating properties. This minimises direct contact between the samples and the ambient environment.

To facilitate temperature monitoring, the handheld carrier 200 includes a display 220 which displays the identification and/or temperature of the sample or a group of samples 202 disposed on the carrier to a user. This enables the user to visually monitor the change in temperature of the samples as they are conveyed from a first temperature-controlled environment, e.g. the cryogenic tank 102 (see FIG. 1), to a second temperature-controlled environment, e.g. another cryogenic tank 102, or some other temperature-controlled container, such as a cryobox.

The display 220 is configured so that is readily observable by a user as the carrier 200 is used to convey the samples from one place to another. For example, the display 220 may be situated on the handle portion 204 of the carrier 200, but away from the region of the handle that will be gripped by the user 208 to avoid the display 220 from being obscured by a user's hand. In an embodiment, the display 220 is located in a region of the handle 204 that is positioned perpendicular to the grip portion 208, such that the user can easily look down at the display 220 whilst gripping the handle. Furthermore, the portion of the handle bearing the display 220 may be substantially parallel to the tray portion 206 of the carrier 200.

Buttons 222 are provided in the vicinity of the display 220 to enable a user to switch the display ON or OFF and navigate between available data, i.e. sample ID and current temperature. It is to be understood that a similar effect could be achieved by providing the display in the form of a touch screen.

Figure 3:
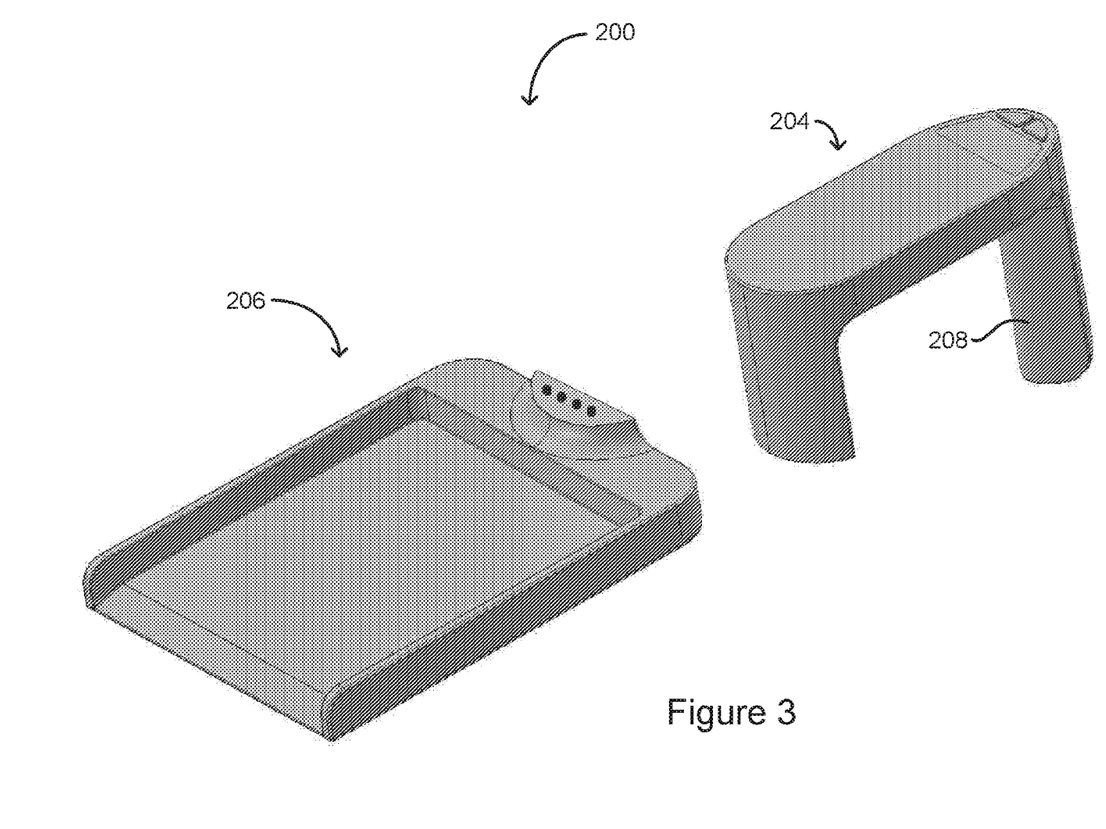
FIG. 3 shows a perspective view of a carrier having a having a handle which can be decoupled from the tray portion in accordance with an embodiment.

Electronic circuitry, a rechargeable power source and memory for storing the sensed data is provided in the handle. It is envisaged that the handle 204 may be configured to be decoupled from the tray portion 206 as shown in FIG. 3. In this embodiment, a single handle 204 can be used to facilitate conveyance of multiple tray portions 206. This provides the advantage that the complex and costly components reside entirely in the handle of the carrier thereby reducing the cost and serviceability issues of having multiple handles.

Moreover, the handheld carrier 200 includes a communications component for transmitting the sensed data to a remote computing system. Whilst the carrier has a local memory for data storage, this feature provides access to supplementary data storage. It is envisaged that the identification and temperature is sensed continuously and the data uploaded to a database that is remote to the carrier periodically or streamed continuously as required. The communications component may transmit the data by wired or wireless means. The entire data log comprising the thermal history of the samples is thereby available for access and analysis from anywhere over a communications network.

The handheld carrier 200 may be configured to accommodate more than one microplate 207 or box housing samples. In one embodiment the tray portion 206 is sized to accommodate one microplate (as shown in FIG. 2).

The handheld carrier 200 has integrated sample identification and temperature sensing capability in the form of embedded identification and temperature sensors 224. It should be appreciated that the sensing capabilities could be provided in any suitable form for operating at cryogenic temperatures. The identification sensing capability is provided by an interrogator embedded in the carrier 200, such as in the tray portion 206 as shown in FIG. 2, for reading machine-readable tags that are either provided on or associated with the samples, i.e. generally by affixing the tags to a box or microplate 207 that carries the samples 202. As previously described, a box or microplate 207 may have any suitable number of machine-readable tags affixed thereto 211. The carrier should ideally have correspondingly located interrogators 224 embedded therein. The machine-readable tags themselves could take the form of barcodes, inductive coupling, optical coupling including laser, visible or non-visible, radio frequency, and chip or chipless radio frequency identification (RFID), or any other suitable means.

The temperature sensors are also embedded in the handheld carrier 200 and may be selected from one or more of an optical sensing means including laser and infra-red, or wired sensing means including thermocouple, thermistor or resistance temperature detectors (RTD). It is to be understood that the foregoing examples are not exhaustive and that other suitable means could be envisaged. The distribution of the temperature sensors may mirror the distribution of the interrogators embedded in the carrier, provided that the temperature sensors are arranged such that they will be in thermal proximity to the samples. Each temperature sensor may be associated with a group of samples, such that where a number of temperature sensors are provided, any variation in temperature across the group of samples held in the box or microplate can be determined.

The handheld carrier 200 can be slid inside the port of a rack or tower to scoop up the sample tray held within. When the microplate 207 or box is positioned on the carrier 200, the identity and the temperature of the one or more samples 202 stored therein are read and displayed on the handle 204 of the carrier 200. As previously described, it is to be understood that the identification and the temperature may relate to a group of samples, or may be sensed and displayed for individual samples. The user can therefore ensure that the correct sample tray 207 is selected for removal from the rack 104 (see FIG. 1) and can monitor the temperature of the samples 202 during transfer to another storage vessel, to a processing station or to a transport module, as required. The temperature and identification data is recorded and can be downloaded or otherwise electronically transmitted to a remote computer or a server either live or at some subsequent time. That is, a true thermal history of a sample can be maintained throughout various transport, transfer and processing activities that the sample may be subject to over the life of the sample.

Figure 4:
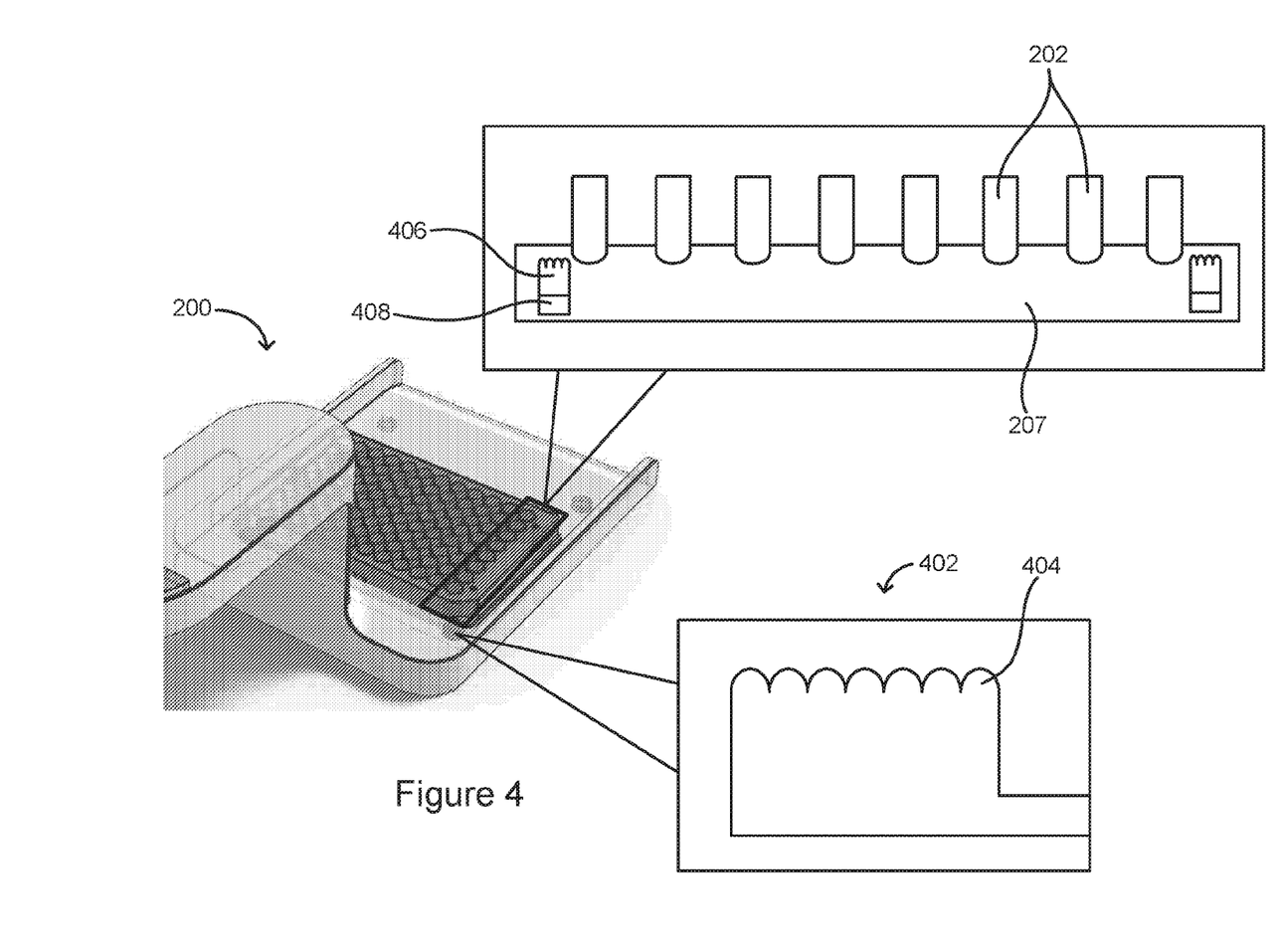
FIG. 4 is a schematic showing an interrogator and machine-readable tag for use with the present disclosure.

In an embodiment, the handheld carrier 200 has embedded interrogators 224 that are read machine-readable tags that encode an identification of the sample or group of samples, and additionally has a temperature dependent characteristic. Whilst the interrogator 224 need not be in direct contact with the samples, it should be in thermal proximity thereto, such that the temperature sensed by the interrogator is representative of the actual temperature of the sample. Referring now to FIG. 4, the interrogator 402 of this type includes an interrogation coil 404 for generating an interrogation signal which is transferred by induction to a coil antenna 406 coupled to the machine-readable tag 408 by inducing an excitation signal in the coil antenna.

The interrogator and machine-readable tag may be of the type described in International Patent Application PCT/AU2008/001293, to the present Applicant, the entire contents of which are incorporated herein by reference. The machine-readable tag associated with the samples includes a plurality of micromechanical vibratable members each having a particular resonant frequency which shifts as a function of temperature. Accordingly, such a machine-readable tag is capable of both encoding encoding an identifier and having a temperature dependent characteristic.

In some embodiments, the handheld carrier 200 emits an alert if the sensed temperature exceeds a predetermined threshold which may be either at or below the critical temperature above which the sample may be degraded. This serves to alert the user if the sample's temperature rises too much. This alert could be of an auditory, visual or sensory nature, e.g. illumination of an LED, a flashing LED, or a change in colour of an LED, an audible alert such as a tone, or a vibration in the handle of the carrier.

A barcode reader may be additionally provided on the carrier to read barcodes on the microplate to provide redundancy in the form of dual sample identification. For example, the rear of the handle may have a bar code reader incorporated therein facing the microplate which may have a bar code disposed on the edge of the mircroplate.

Figure 5:
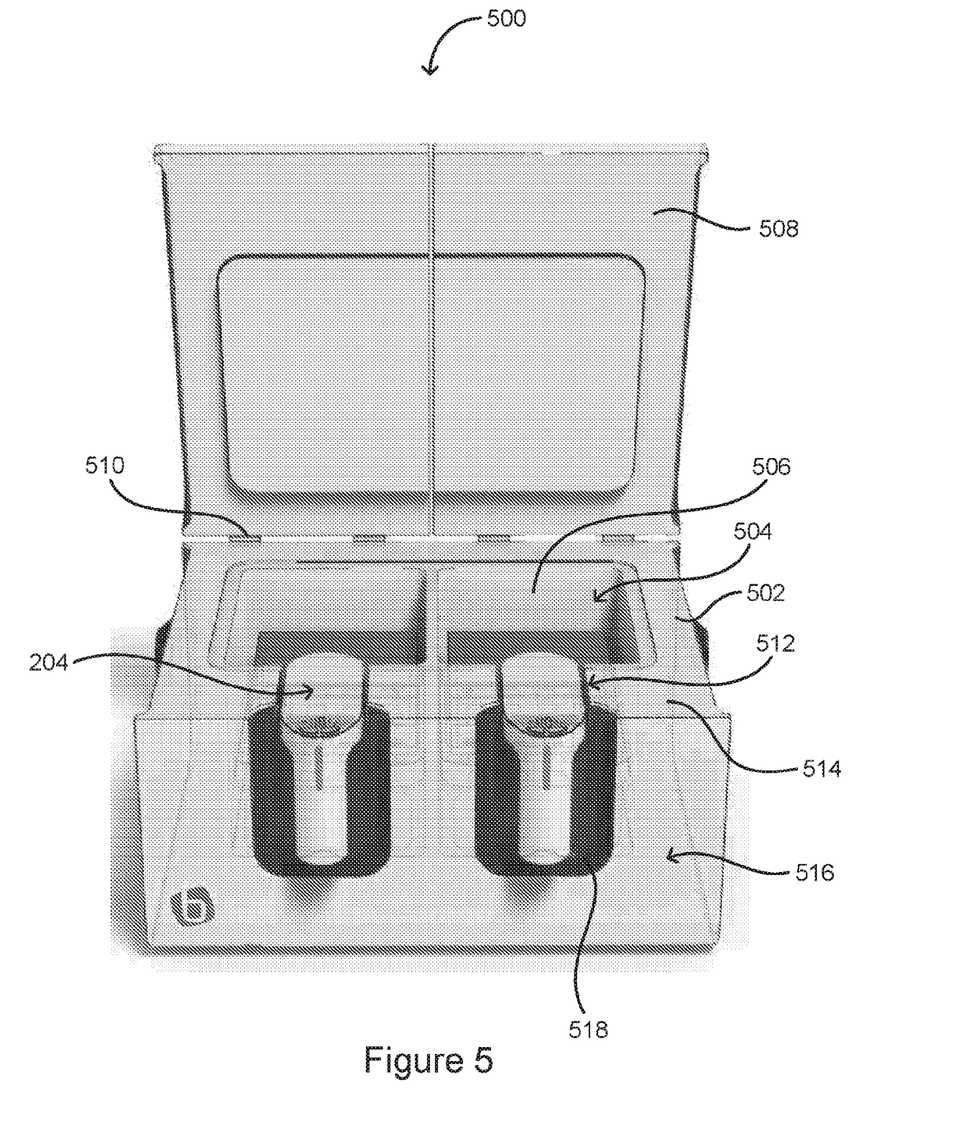
FIG. 5 shows a perspective view of a temperature-controlled container for receiving and housing one or more carriers according to an embodiment with the lid open showing two carriers housed therein.
Figure 6:
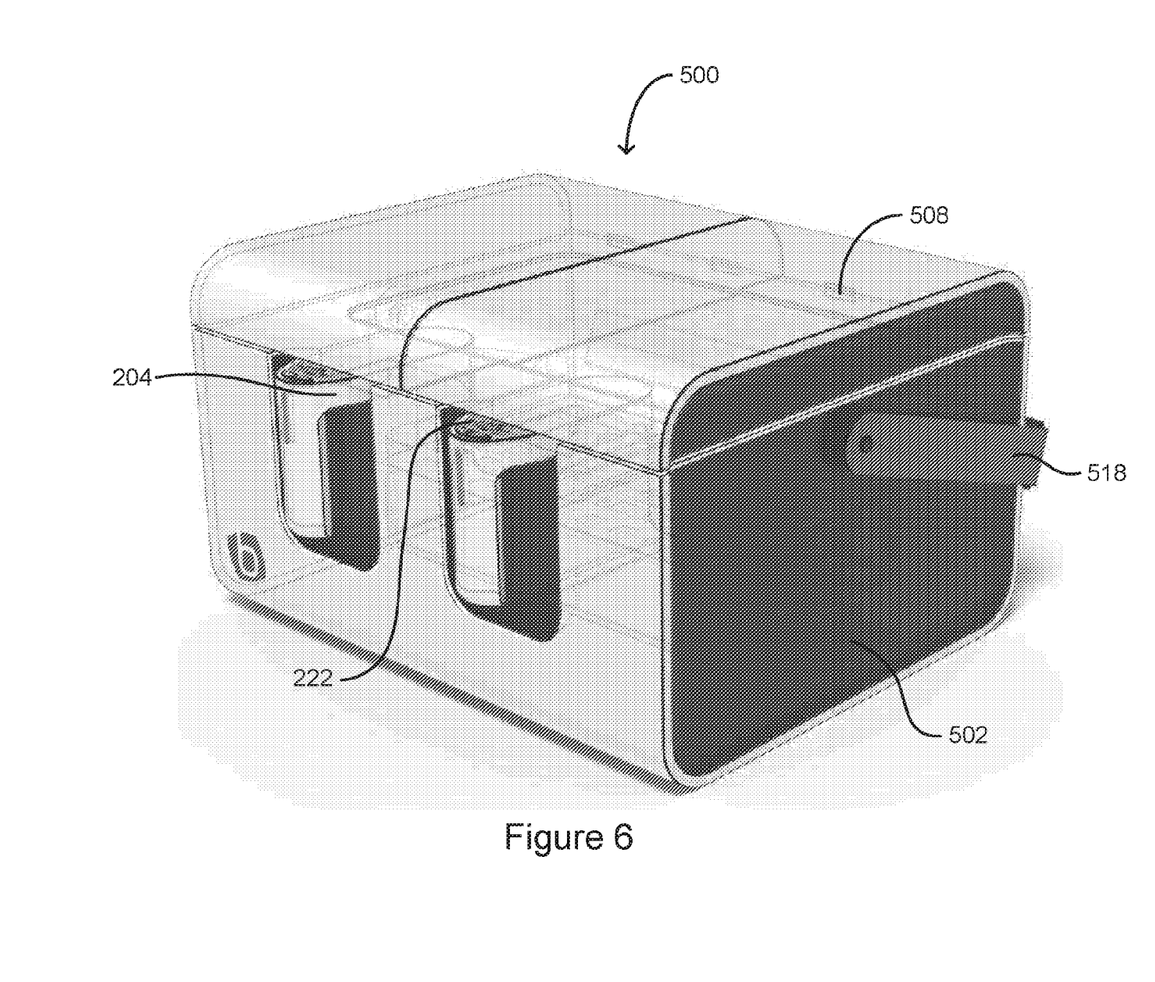
FIG. 6 shows a perspective view of the temperature-controlled container of FIG. 5 with the lid closed.

Referring now to FIG. 5, the handheld carrier 200 is configured to be placed inside a temperature-controlled container 500. The carrier 200 (see FIGS. 2 and 3) and container 500 together form a transfer system. The temperature-controlled container 500 is made of a thermally insulating material with thick walls and can be cooled to cryogenic temperatures. In some embodiments, the temperature-controlled container 500 is portable. In this embodiment, a carry handle 518 is provided (see FIG. 6) and the container will be suitably dimensioned to be transportable by hand. The temperature controlled container 500 generally includes a housing 502 that has an opening 504 forming an internal cavity 506. The internal cavity 506 is configured to receive one or more carriers 200 therein. A lid 508 that may be hinged 510 to the container 500 is configured to close the opening 504. In some embodiments, the housing 502 includes a recess 512 in a wall 514 of the container 500, such as for example the front wall in the illustrated embodiment. The recess 512 is configured to receive the handle 204 of the carrier 200 when the carrier resides in the internal cavity 506. The handle 204 accordingly extends through the wall 514 of the container 500 whilst being in thermally sealed engagement therewith. Once the lid 508 is closed (as shown in FIG. 6), the internal cavity 506 is substantially sealed.

It will be envisaged therefore, that where the temperature-controlled container 500 is configured to receive more than one carrier 200 in a side-by-side arrangement as shown in FIG. 5, it would be advantageous to have a separate internal cavity 506 and split lid 508 arrangement dedicated to each carrier so that each carrier has its own temperature-controlled environment and will not be unnecessarily exposed to the ambient environment if an adjacently located carrier is being handled or otherwise.

It is envisaged that the temperature-controlled container 500 with a side-by-side arrangement further provides an ideal environment for handling samples, for example, if samples are to be transferred from one microplate to another. This is since the carrier with integrated identification and temperature sensing capability will not only continuously monitor the temperature, but also should also automatically record the transfer of the sample from one microplate to another in the associated database.

Alternative arrangements for the temperature-controlled container 500 are envisaged where the container is configured to receive more than one carrier 200 in a stacked arrangement (not shown). In respect of both the stacked and the side-by-side configurations, the container 500 may be configured for either top loading or side loading.

The front face 516 of the temperature-controlled container 500 may include a recess 518 adapted to substantially accommodate the handle 204 so that handle does not significantly protrude from the front face of the housing 502 when placed inside.

Referring now to FIG. 6, there is shown the temperature-controlled container 500 with the lid 508 in the closed position. In this view it can be appreciated that the display 222 on the handle of the carrier 200 is configured such that the display remains observable by a user when the carrier is placed in the temperature-controlled container 500 and the lid 508 closed. This enables the identification and temperature data to be navigated and observed by a user while the samples are in a temperature-controlled environment.

The interior of the temperature-controlled container 500 includes a well at the base of the internal cavity including a reservoir for liquid nitrogen and a thermally conductive base to act as a heat sink, keeping the well cold and providing a uniform temperature across the base of the carrier. Moreover, suitable baffles or other retaining members may be provided to contain the liquid nitrogen within the well and minimise it slopping around within the cavity.

The temperature-controlled container 500 may have electrical connection to the carriers at ports aligned to the carrier handles, e.g. in the recess configured to receive 512 the handle 204 of the carrier 200, for charging the power source of the carrier. The temperature-controlled storage container 500 may also include a server or database that can communicate with the electronics of the carrier to store temperature and identification data.

If the temperature of the temperature-controlled container is maintained at one which is higher than the thaw temperature of the samples, the container can be used as a thaw bath. The handheld carrier containing samples to be thawed can be placed inside the container and the samples contained therein would be thawed at a controlled rate.

Also provided is a method for monitoring samples stored in a temperature-controlled storage environment during transport and handling. The method involves transferring samples between a temperature-controlled storage facility and a portable temperature-controlled container using a carrier to transfer the samples to and from a temperature-controlled storage facility. The portable temperature-controlled container is configured to receive and house one or more carriers. Once the samples are positioned on the carrier, the identification and temperature of the samples is read using an integral identification and temperature sensing capability provided in the carrier. The identification and temperature of the samples placed on the carrier are then displayed to a user.

It is an advantage of the present that a system and apparatus is provided which facilitates the transfer of biological samples between temperature-controlled environments in a manner that maintains the integrity of the samples by enabling a user to minimises changes in temperature of the sample by providing awareness of the sample temperature when the samples are being conveyed from one temperature-controlled environment to another. Moreover, the continuous tracking of temperature for a particular sample, enables a true thermal history of the sample to be maintained.

While the disclosure has been described in conjunction with a limited number of embodiments, it will be appreciated by those skilled in the art that many alternative, modifications and variations in light of the foregoing description are possible. Accordingly, the present disclosure is intended to embrace all such alternative, modifications and variations as may fall within the spirit and scope of the disclosure as disclosed.

The invention claimed is:
1. A handheld carrier comprising:
   a handle and a tray portion for conveying and monitoring samples during transport, handling and storage; and
   an integrated sample identification and temperature sensor configured to monitor a thermal history of one or more samples during transport, handling, storage, and as the sample is conveyed between a first temperature- controlled storage environment and a second temperature-controlled storage environment,
wherein the handle is coupled to the tray portion and the handle comprises a generally planar top surface extending from the tray, a grip portion descending vertically therefrom and the tray portion including a bearing surface,
wherein the tray portion is configured to be slid into a port of a rack or tower provided in the first temperature-controlled storage environment in order to withdraw a sample located in the port; and
wherein the handle is configured to be decoupled from the tray portion and recoupled to another tray portion to enable the handle to be used to facilitate conveyance of more than one said tray portion between the first temperature-controlled storage environment and the second temperature-controlled storage environment.

2. The handheld carrier according to claim 1, wherein the handheld carrier further includes a display configured to display to a user the identification and/or temperature of one or more samples placed on the handheld carrier and the display is configured to be observable by a user as the handheld carrier is used to transfer samples to or from the first and/or second temperature-controlled environment and/or once the handheld carrier is placed in the first and/or second temperature-controlled environment.

3. The handheld carrier according to claim 1, wherein the handheld carrier includes one or more integrated interrogators for reading one or more machine readable tags, each machine readable tag being associated with at least one sample positioned on the tray portion in thermal proximity thereto, and each machine readable tag encoding an identifier and having a temperature dependent characteristic.

4. The handheld carrier according to claim 3, wherein the one or more integrated interrogators each include an interrogation coil configured to interrogate the machine readable tags associated each with the samples, wherein the interrogation coil or coils are positioned such that they are in proximity to a machine readable tag associated with a sample placed on the handheld carrier in use.

5. The handheld carrier according to claim 1, wherein the handheld carrier further includes an alert component which emits an alert if a sensed temperature exceeds a predetermined threshold.

6. The handheld carrier according to claim 1, wherein the handheld carrier further includes a communications component for transmitting the identification and temperature of one or more samples placed on the handheld carrier to a remote computing system to provide a data log accessible over a communications network.

7. The handheld carrier according to claim 2, wherein the display is situated on the generally planar top surface of the handle.

8. The handheld carrier according to claim 1, wherein the tray portion of the handheld carrier is configured to accommodate different numbers and arrangements of sample trays.

9. The handheld carrier according to claim 1, wherein the second temperature-controlled storage environment is a portable temperature-controlled container for receiving and housing the handheld carriers.

10. The handheld carrier according to claim 9, wherein the portable temperature-controlled container includes an integrated sample identification and temperature sensing capability configured to monitor a thermal history of one or more samples during transport, handling and storage.

11. The handheld carrier according to claim 9, wherein the handheld carrier or the portable temperature-controlled container includes one or more integrated interrogators for reading one or more machine-readable tags, each machine-readable tag being associated with at least one sample positioned on the tray portion in thermal proximity thereto, and each machine-readable tag encoding an identifier and having a temperature dependent characteristic.

12. The handheld carrier according to claim 11, wherein the integrated interrogators comprise an integrated signal processing circuitry to generate an interrogation signal in an interrogation coil such that when the interrogation coil is in proximity with a coil antenna coupled to the machine-readable tag an excitation signal is induced in the coil antenna from the interrogation signal in the interrogation coil.

13. The handheld carrier according to claim 11, wherein the machine-readable tag includes at least one resonant member and the temperature dependent characteristic is a shift in resonant frequency of the at least one resonant member as a function of temperature.

14. The handheld carrier according to claim 9, wherein the portable temperature-controlled container further includes: a housing having an opening forming an internal cavity configured to receive the one or more handheld carriers; a lid configured to close the opening; wherein the housing further includes a recess configured to receive the handle of the or each handheld carrier such that closing of the lid seals the internal cavity when the one or more handheld carriers are placed in the housing.

15. The handheld carrier according to claim 14, wherein an exterior of the housing includes a recess adapted to receive the handle therein such that the handle does not significantly protrude from a front face of the housing when the one or more handheld carriers are placed in the housing.

16. The handheld carrier according to claim 14, wherein the housing is configured to receive more than one handheld carrier in a side-by-side arrangement, such that each handheld carrier is housed in a separate cavity and the lid is split to provide for individual sealing of each separate cavity.

* * * * *